United States Patent
Palsetia et al.

(10) Patent No.: US 11,048,757 B2
(45) Date of Patent: Jun. 29, 2021

(54) CUCKOO TREE WITH DUPLICATE KEY SUPPORT

(71) Applicant: EMC IP Holding Company LLC, Hopkinton, MA (US)

(72) Inventors: Nushafreen Dara Palsetia, Mumbai (IN); Joris Johannes Wils, Framingham, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 180 days.

(21) Appl. No.: 16/530,072

(22) Filed: Aug. 2, 2019

(65) Prior Publication Data
US 2021/0034674 A1    Feb. 4, 2021

(51) Int. Cl.
*G06F 17/00*    (2019.01)
*G06F 16/901*    (2019.01)

(52) U.S. Cl.
CPC ...... *G06F 16/9027* (2019.01); *G06F 16/9014* (2019.01); *G06F 16/9017* (2019.01)

(58) Field of Classification Search
CPC ............. G06F 16/9027; G06F 16/9017; G06F 16/9014
See application file for complete search history.

(56) References Cited

U.S. PATENT DOCUMENTS

| | | | | |
|---|---|---|---|---|
| 2007/0294506 A1* | 12/2007 | Ross | ................... | G06F 12/0897 711/216 |
| 2011/0202744 A1* | 8/2011 | Kulkarni | ............ | G06F 12/1018 711/216 |
| 2012/0166448 A1* | 6/2012 | Li | .......................... | G06F 16/11 707/747 |
| 2017/0249218 A1* | 8/2017 | Falkinder | ............ | G06F 11/1453 |
| 2018/0203917 A1* | 7/2018 | Marshall | ............... | G06F 16/285 |

OTHER PUBLICATIONS

U.S. Appl. No. 16/530,433, filed Aug. 2, 2019, Nanda et al.
U.S. Appl. No. 16/177,240, filed Oct. 31, 2018, Wils.
Xiaozhou Li et al., Algorithmic Improvements for Fast Concurrent Cuckoo Hashing, http://www.cs.princeton.edu/~mfreed/docs/cuckoo-eurosys14, 38 pages.

* cited by examiner

*Primary Examiner* — Syed H Hasan
(74) *Attorney, Agent, or Firm* — Daly, Crowley Mofford & Durkee, LLP

(57) ABSTRACT

An aspect of implementing a Cuckoo tree includes providing a Cuckoo filter table for performing lookups in a Cuckoo tree. The table tracks fingerprints of keys and tablets in which the keys reside. An aspect also includes providing a stash configured to manage duplicate keys in the tree. The stash includes: a key hash table that stores full keys corresponding bucket index references that point to a reverse time ordered list of values corresponding to the full keys; and a value store having buckets with slots for storing the list. An aspect further includes setting a duplicate threshold value in the tree that provides a limit on a number of fingerprints that can exist in a bucket. During a store operation on a key, upon determining the number of existing entries with same fingerprint in target bucket would exceed the threshold, another bucket is selected for the key.

18 Claims, 6 Drawing Sheets

600A

| 0 | 0 | 0 | 0 | 1 | 1 | 1 | 1 | 0 | 0 |
|---|---|---|---|---|---|---|---|---|---|
| 1 | 2 | ... | n-1 | n | n+1 | ... | m | ... | p |

| 1 | 1 | 1 | 1 | 0 | 0 | 0 | 0 | 0 | 1 |
|---|---|---|---|---|---|---|---|---|---|
| 1 | 2 | ... | n-1 | n | n+1 | ... | m | ... | p |

| 1 | 1 | 1 | 1 | 1 | 1 | 1 | 1 | 0 | 1 |
|---|---|---|---|---|---|---|---|---|---|
| 1 | 2 | ... | n-1 | n | n+1 | ... | m | ... | p |

FIG. 6C

CUCKOO TREE WITH DUPLICATE KEY SUPPORT

BACKGROUND

A data storage system is an arrangement of hardware and software that typically includes one or more storage processors coupled to an array of non-volatile data storage devices, such as magnetic disk drives, electronic flash drives, and/or optical drives. The storage processors service host input/output (I/O) operations received from host machines. The received I/O operations specify storage objects (e.g. logical disks or "LUNs") that are to be written to, read from, created, or deleted. The storage processors run software that manages incoming I/O operations and that performs various data processing tasks to organize and secure the host data received from the host machines and stored on the non-volatile data storage devices.

In addition to storing and retrieving data, data storage systems also store metadata associated with the data in order to manage the data effectively. Deduplication and compression capable log structured storage (LSS) devices are characterized by many disparate amounts of metadata that must be persistently stored or removed with each unit of user data. It is common that in LSS several operations may be needed for a unit of user data and each operation involves saving some metadata that is stored twice for redundancy. The amount of metadata stored is typically greater than that of user data storage. Additionally locks are usually taken when storing the above metadata block which can reduce performance and increase the likelihood of deadlocks. The resultant large amount of metadata write and lock overhead is a significant gating factor on the devices' performance and persistent storage (e.g., drive) wear.

SUMMARY

This Summary is provided to introduce a selection of concepts in a simplified form that are further described herein in the Detailed Description. This Summary is not intended to identify key features or essential features of the claimed subject matter, nor is it intended to be used to limit the scope of the claimed subject matter.

One aspect may provide a method for implementing a Cuckoo tree with duplicate key support. The method includes providing a Cuckoo filter table configured to perform lookups in a Cuckoo tree. The Cuckoo filter table tracks fingerprints of keys and tablets in which the keys reside. The method also includes providing a Cuckoo stash configured to manage duplicate keys in the Cuckoo tree. The Cuckoo stash includes: a key hash table storing full keys and corresponding bucket index references that point to a reverse time ordered list of values corresponding to the full keys, where all of the values that correspond to a given key are stored on a fixed number of cache lines in a value store, the value store having buckets containing slots for storing the reverse time ordered list of values. The stash bucket is a 64-bit quadword placed onto a cache line into which the values are stored in adjacent bitfields. The method further includes setting a duplicate threshold value in the Cuckoo tree. The duplicate threshold value provides a limit on a number of fingerprints that can exist in a cuckoo filter bucket. A filter bucket is a small array. In one embodiment it is a 64-bit quadword into which the fingerprints are stored as bitfields. During a store operation on a key, upon determining the number of existing entries with same fingerprint in a target filter bucket would exceed the duplicate threshold, another filter bucket is selected for the key.

Another aspect may provide a system for implementing a Cuckoo tree with duplicate key support. The system includes a memory having computer-executable instructions. The system also includes a processor operated by a storage system. The processor executes the computer-executable instructions. When executed by the processor, the computer-executable instructions cause the processor to perform operations. The operations include providing a Cuckoo filter table configured to perform lookups in a Cuckoo tree. The Cuckoo filter table tracks fingerprints of keys and tablets in which the keys reside. The operations also include providing a Cuckoo stash configured to manage duplicate keys in the Cuckoo tree. The Cuckoo stash includes: a key hash table storing full keys and corresponding bucket index references that point to a reverse time ordered list of values corresponding to the full keys, where all of the values that correspond to a given key are stored on a fixed number of cache lines in a value store, the value store having has buckets containing slots for storing the reverse time ordered list of values. The stash bucket is a 64-bit quadword placed onto a cache line into which the values are stored in adjacent bitfields. The operations further include setting a duplicate threshold value in the Cuckoo tree. The duplicate threshold value provides a limit on a number of fingerprints that can exist in a cuckoo filter bucket. A filter bucket is a small array. In one embodiment it is a 64-bit quadword into which the fingerprints are stored as bitfields. During a store operation on a key, upon determining the number of existing entries with same fingerprint in a target filter bucket would exceed the duplicate threshold, another filter bucket is selected for the key.

Another aspect may provide a computer program product for implementing a Cuckoo tree with duplicate key support. The computer program product is embodied on a non-transitory computer readable medium. The computer program product includes instructions that, when executed by a computer at a storage system, causes the computer to perform operations. The operations include providing a Cuckoo filter table configured to perform lookups in a Cuckoo tree. The Cuckoo filter table tracks fingerprints of keys and tablets in which the keys reside. The operations also include providing a Cuckoo stash configured to manage duplicate keys in the Cuckoo tree. The Cuckoo stash includes: a key hash table storing full keys and corresponding bucket index references that point to a reverse time ordered list of values corresponding to the full keys, where all of the values that correspond to a given key are stored on a fixed number of cache lines in a value store, the value store having buckets containing slots for storing the reverse time ordered list of values. The stash bucket is a 64-bit quadword placed onto a cache line into which the values are stored in adjacent bitfields. The operations further include setting a duplicate threshold value in the Cuckoo tree. The duplicate threshold value provides a limit on a number of fingerprints that can exist in a cuckoo filter bucket. A filter bucket is a small array. In one embodiment it is a 64-bit quadword into which the fingerprints are stored as bitfields. During a store operation on a key, upon determining the number of existing entries with same fingerprint in a target filter bucket would exceed the duplicate threshold, another filter bucket is selected for the key.

The foregoing summary is presented for illustrative purposes to assist the reader in readily grasping example features presented herein. However, the foregoing summary is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

FIGS. 6A-6C are example bitmaps produced in response to the find key operation of FIG. 5 according to various embodiments.

DETAILED DESCRIPTION OF THE INVENTION

Figure 1:
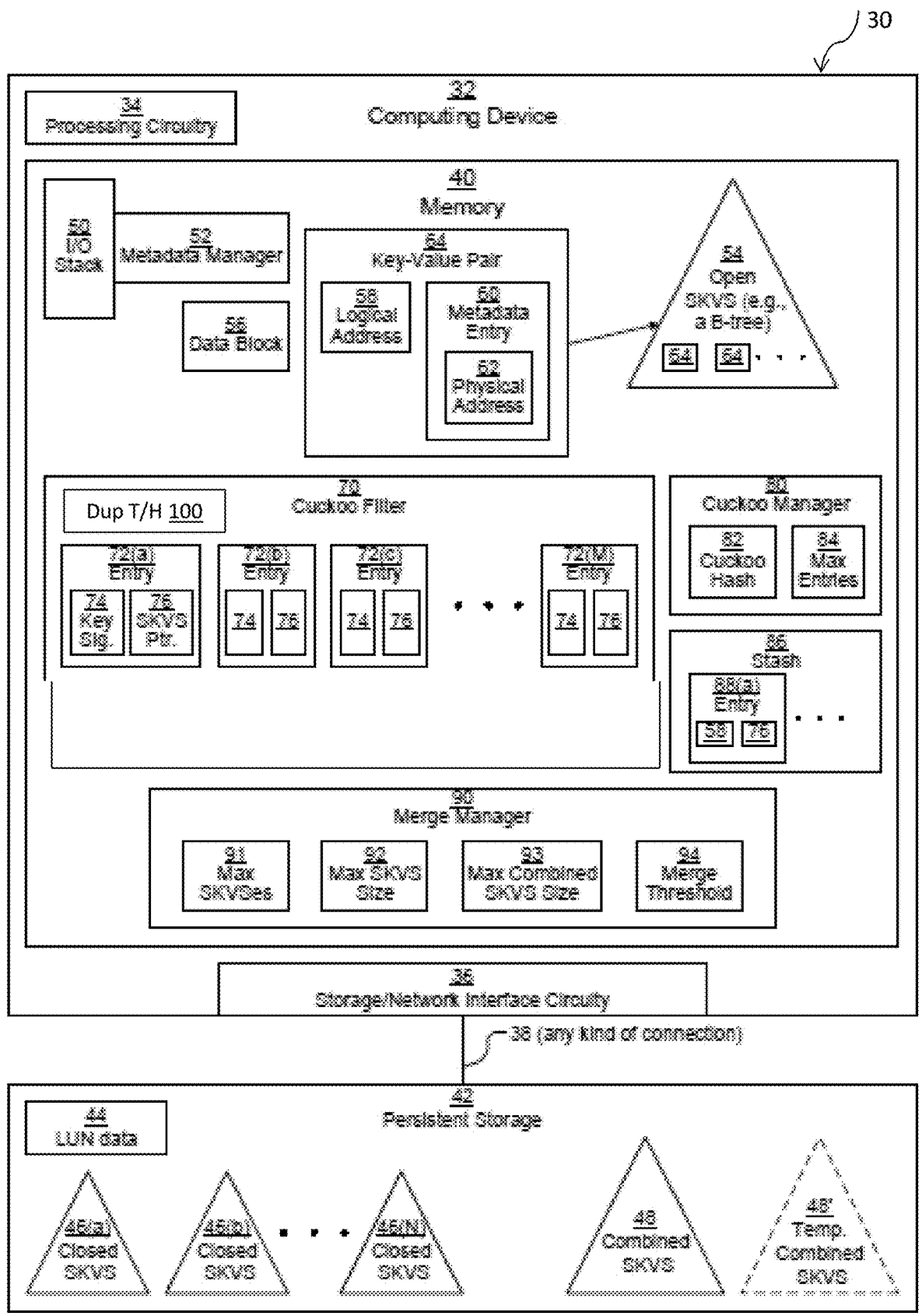
FIG. 1 is a block diagram depicting an example system and apparatuses for use in connection with various embodiments.

The embodiments described herein provide an extension to a technique for storing metadata that is described in commonly assigned U.S. patent application Ser. No. 16/177,240, entitled "Storing Metadata in a Cuckoo Tree," filed on Oct. 31, 2018, the entire contents of which are incorporated herein by reference. The above-referenced technique builds a Cuckoo tree for storing the metadata which allows many entries to be written to the tree and for quick searches with low thread contention. While the above-referenced technique for storing metadata provides improved storage performance and density at lower cost than previous techniques, the tree assumes that a key only exists once in a tree. If the key is updated then a new entry will obsolete the old entry for that key.

In some applications, entries with the same key will need to be stored numerous times. For example, in many metadata applications there is a need to maintain reference counts. In such applications, each entry is a numerical increment or decrement to an absolute value associated with the entry. In such applications, a search on the key must either consolidate the matching entries or return the individual matching entries.

Another example is the need to understand the usage heat map for a chunk corresponding with the key. The heat map can be used to see when the chunk was updated and thus be used to predict when it is likely to be updated again. This information can be used to determine an optimal location for the chunk given its predicted usage.

The embodiments described herein provide an extension to the above-referenced Cuckoo tree with B-tree duplicate key support and a modified Cuckoo filter enhanced with a Cuckoo stash (Stash). The Cuckoo filter, which acts as a filter for lookups to the Cuckoo tree, is enhanced with a Cuckoo stash (e.g., to handle the case for duplicate keys stored in the tree), and limits false positives for improved lookup performance.

The embodiments provide a duplication threshold value to limit the number of times a fingerprint for a key may exist in a bucket(s) to reduce the worst-case number of false positives. The limit is a simple check added to the store operation. If during the store of a key the number of existing entries with the same fingerprint in a target filter bucket of the trial Cuckoo path would exceed a threshold, then the Cuckoo path is considered blocked and another must be tried.

If all Cuckoo paths are blocked, then the key will be added to a special lookaside table, referred to herein as a Stash, which is designed to handle duplicates, i.e. multiple keys hashing to the same fingerprint or the same key being added multiple times to the Cuckoo tree with different values. The Stash will mostly end up having keys that are duplicated often as those keys overflowed the Cuckoo filter's bucket duplication threshold. The Cuckoo filter's stash will store full keys (not fingerprints) so it will not have false positives. Storing the entire key is feasible because the number of keys in the stash is expected to be much fewer as compared to the number in the main Cuckoo filter table, with each key having multiple values.

Turning now to FIG. 1, a system 30 for implementing a Cuckoo tree with duplicate keys will now be described in accordance with embodiments. The system 30 includes a computing device 32 connected to persistent data storage 42 via connection 38. In some embodiments, the persistent data storage 42 may be locally installed within the same chassis as computing device 32, while in other embodiments, the persistent data storage 42 may be external to or remote from computing device 32.

Computing device 32 may be any kind of computing device, such as, for example, a personal computer, workstation, server computer, enterprise server, data storage system (DSS) rack server, laptop computer, tablet computers, smart phone, mobile computer, etc. Typically, computing device 32 is a DSS rack server. Computing device 32 includes processing circuitry 34, storage interface and/or network interface circuitry 36, and memory 40. Computing device 32 may also include other components as are well-known in the art, including interconnection circuitry.

Processing circuitry 34 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

Storage interface and/or network interface circuitry 36 provides access and an interface to connection 38 to persistent data storage 42 and may control persistent data storage 42. Connection 38 may be any kind of connection over which computing device 32 can communicate with persistent data storage 42 such as, for example, Ethernet cables, Wireless Fidelity (Wi-Fi) wireless connections, an IP network, SCSI cables, SATA cables, Fibre Channel (FC) cables, etc. If connection 38 is a network connection, then storage interface and/or network interface circuitry 36 may include, for example, one or more Ethernet cards, cellular modems, FC adapters, Wi-Fi wireless networking adapters, and/or other devices for connecting to a network. If connection 38 is a local storage connection, then storage interface and/or network interface circuitry 36 may include for example, SCSI, SAS, ATA, SATA, FC, and/or other similar controllers and ports.

Persistent data storage 42 may include any kind of persistent storage devices, such as, for example, hard disk drives, solid-state storage devices, flash drives, etc. Persistent data storage 42 stores user data as LUN data 44, which represents one or more logical disks accessible by users. LUN data 44 is organized and managed with reference to metadata that is stored within various data structures, including a set of RO tablets (which are implemented as closed sorted key-value structures (SKVSs)) 46 and a larger combined tablet (which is implemented as a combined SKVS) 48, both stored on persistent storage 42, as well as within active, read/write (RW) tablets (which are implemented as open SKVSs) 54 stored within memory 40. Tablets 46, 48, 54 may be any kind of sorted data structures configured to provide fast access to key-value pairs, such as, for example, B–trees, B+trees, B*-trees, binary trees, etc.

Memory 40 may be any kind of digital system memory, such as, for example, random access memory (RAM). Memory 40 stores an operating system (OS, not depicted) in operation (e.g., a Linux, UNIX, Windows, MacOS, or similar operating system). Memory 40 also stores an input/output (I/O) stack 50 in operation. I/O stack 50 allows I/O requests (not depicted) from external hosts (as well as local applications) to be processed with respect to the LUN data 44 managed by the computing device 32.

Memory 40 also stores metadata manager 52, Cuckoo manager 80, and merge manager 90 in operation. In some embodiments, metadata manager 52 is part of I/O stack 50, and in other embodiments, metadata manager 52 operates as an external driver called by I/O stack 50. Metadata manager 52 operates to generate and manage metadata for each data block 56 processed by the I/O stack 50. Metadata manager 52 operates to create a metadata entry 60 that includes various metadata about the block 56, such as, for example, the physical address 62 where the data block 56 is stored in persistent storage 42. In some embodiments, metadata entry 60 also includes statistics information, a timestamp, checksum, block length, and compression algorithm (all not depicted). In one embodiment, each metadata entry 60 is 24 bits long, including 8 bits for the physical address 62.

Metadata manager 52 operates to insert a key-value pair 64 associated with each data block 56 into a Cuckoo tree (not directly depicted) whenever the metadata for that data block 56 is updated. Each key-value pair 64 is keyed by the logical address 58 of its associated data block 56. For example, in one embodiment, the logical address 58 may be a combination of a 24-bit LUN identifier (not depicted) that identifies which LUN (not depicted) the data block belongs to and a 48-bit logical block address (not depicted) within that LUN. If the logical address 58 is also 8 bytes long, then each key-value pair 64 is 32 bytes long in one example embodiment.

Metadata manager 52 also operates to read, from the Cuckoo tree, a key-value pair 64 associated with a data block 56 whenever metadata manager 52 needs to access the metadata of that data block 56. Metadata manager 52 is able to insert or read key-value pair 64 into or from a Cuckoo tree by calling on Cuckoo manager 80.

Cuckoo manager 80 operates to manage the Cuckoo tree. A Cuckoo tree is a complex distributed data structure made up of a Cuckoo filter 70 (stored in memory 40), the open tablet tree 54 (also stored in memory 40), the set of closed tablets 46 (stored in persistent storage 42) and the combined tablet 48 (also stored in persistent storage 42). In some embodiments, the Cuckoo tree also includes a Stash 86 stored in memory 40.

Cuckoo manager 80 operates to receive a key-value pair 64 for insertion in the Cuckoo tree and to apply a Cuckoo hash algorithm 82 to the key (which is the logical address 58 in typical embodiments) to index into the Cuckoo filter 70. In embodiments, the Cuckoo filter 70 manages a duplicate threshold value 100 and includes a Stash 86 and a Cuckoo filter 70. These elements are described further herein.

Cuckoo manager 80 operates to insert the received key-value pair 64 into the open tablet 54 and to place a tablet pointer 76 that points to the current open tablet 54 into the Cuckoo filter 70 in connection with the logical address 58 key.

Cuckoo filter 70 includes a set of entries 72 (depicted as entries 72($a$), 72($b$), 72($c$), . . . , 72(M)). Cuckoo filter 70 is configured to hold no more than a maximum number 84 of entries 72. Each entry 72 includes a key fingerprint (or signature) 74 as well as a pointer 76 to a particular tablet 46, 54 in which a key-value pair 64 is stored that is indexed by the same logical address 58 that was used to index into the Cuckoo filter 70 upon that entry 72 having been inserted. Each tablet 46, 54 has a unique identifier that can be used to point to that tablet 46, 54. Since each closed tablet 46 in persistent storage 42 was originally an open tablet 54 stored in memory, even though the tablet pointer 76 inserted into each entry 72 always points to open tablet 54 upon insertion, once the open tablet 54 is closed and moved into persistent storage 42 as a new closed tablet 46 (having the same unique identifier as was used when it was an open tablet 54), the tablet pointer 76 becomes important. In some embodiments, each entry 72 is 3 bytes long.

Figure 3:
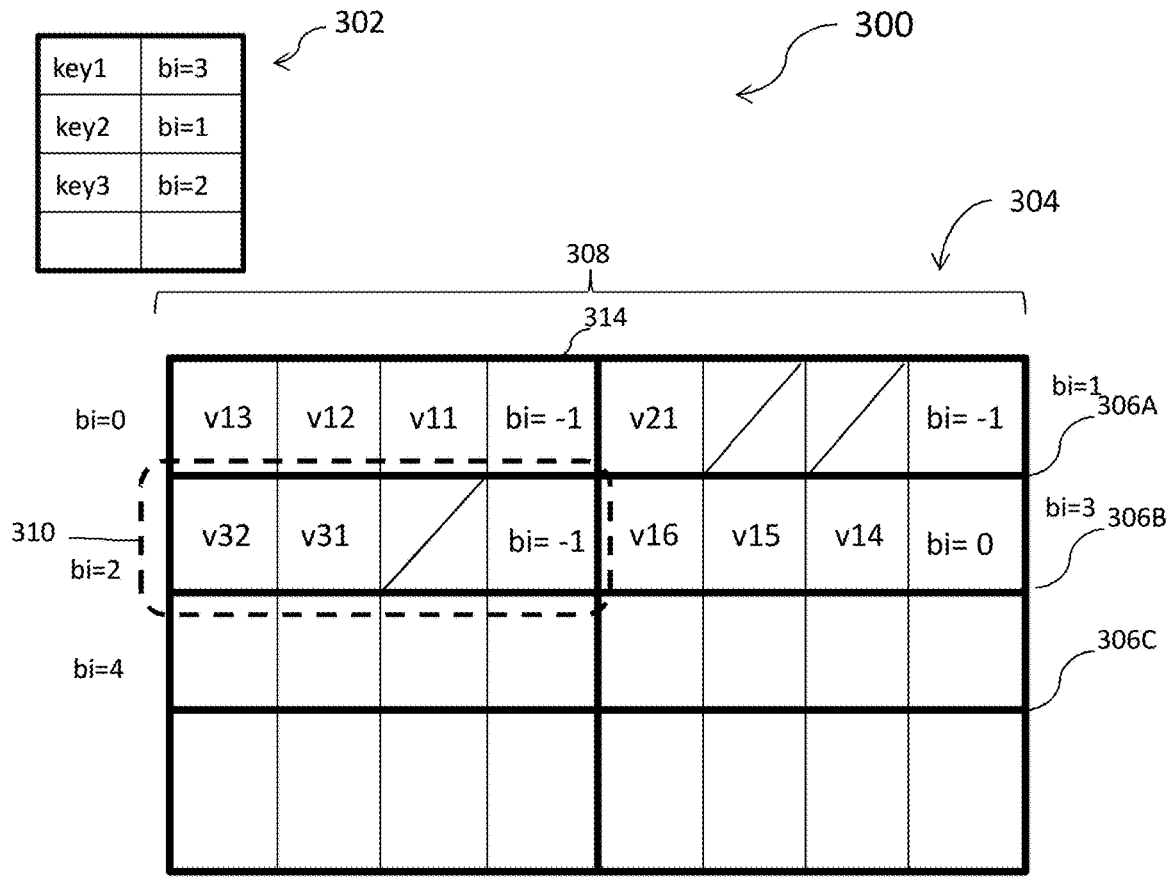
FIG. 3 is a diagram depicting a Stash according to various embodiments.

As shown in FIG. 3, in some embodiments, Cuckoo filter 200 may be subdivided into a set of cachelines. Each cache line broken into a plurality of fingerprint buckets 201 and a Value bit store 203. Each fingerprint bucket 201, a quad-word, can hold up the fingerprints of a preconfigured number (e.g., 2, 4, etc.) of entries 72. The value bit store 203 contains the value bitfields associated with said entries 72. It should be noted that although two entries 72 that share a common key signature 74 could both relate to the same logical address 58, since the logical address 58 is hashed, it is also possible that the two entries 72 with a common key signature 74 relate to two different logical addresses 58.

In some embodiments, if Cuckoo manager 80 is not able to successfully place an entry 72 into the Cuckoo filter 70 due to the appropriate fingerprint bucket 201($s$) being full, instead of placing entry 72 into the Cuckoo filter, Cuckoo manager 80 places an entry 88 88 (depicted as entries 88($a$), . . . ) into Stash 86. Entry 88 includes the same tablet pointer 76 as the entry 72 that would have been inserted into Cuckoo filter 70 were the appropriate bucket(s) not full, but instead of being keyed by hashed key signature 74, entry 88 is keyed directly by the logical address 58.

Cuckoo manager 80 also operates to invoke merge manager 90 as a background process to close an open tablet 54 when it gets full (i.e., once it reaches a configured maximum tablet size 92, representing the number of key-value pairs 64 that an tablet 46, 54 can hold, e.g., 256 or $2^{17}$) and to move it out of memory 40 into persistent storage 42 as a new closed tablet 46 having the same identifier as when it was an open tablet 54. In some embodiments, the identifiers are monotonically increasing consecutive integers up to a maximum permitted number 91 of tablets 46, 54 (e.g., 1024), after which the identifiers may wrap back down to zero.

Merge manager 90 also operates to assess how many closed tablets 46 there are in persistent storage 42 at any given time, so that once that number reaches a merge threshold 94 (e.g., 512 closed tablets 46, which is often set to be half of the maximum permitted number 91 of tablets 46, 54), merge manager 90 is triggered to merge all of the merge threshold 94 number of closed tablets 46 in persistent storage 42 into the combined tablet 48. Combined tablet 48 may be much larger than any of the ordinary open or closed tablets 46, 54. For example, while the maximum tablet size 92 may be $2^{17}$, the maximum combined tablet size 93 is typically $2^{30}$, which is over 8,000 times larger. In some embodiments, the closed tablets 46 are all merged directly into a preexisting combined tablet 48, while in other embodiments, the closed SKVStablets 46 and the preexisting combined tablet 48 are all merged into a temporary combined tablet 48', which is then swapped to become the regular combined tablet 48 upon the merge operation completing. The merging process makes sure to eliminate key-value pairs 64 with duplicate logical addresses 58, only merging the most recent key-value pair 64 in any such set of duplicates (which, in some embodiments, may be identified using the monotonically-increasing integer identifier of each tablet 46, 54). Although this merging may take a significant amount of time to complete, new closed tablets 46 that are not part of the merge operation may continue to accrue within persistent storage 42.

In operation, if metadata manager 52 wants to obtain the metadata entry 60 for a given logical address 58 (e.g., to find the physical address 62 at which that logical address is stored), it sends the logical address to the Cuckoo manager 80 so that Cuckoo manager 80 can search the Cuckoo tree for the appropriate key-value pair 60. Cuckoo manager 80 does this by first checking the Stash 86 for an entry 88 indexed by the given logical address 58 (in embodiments in which a Stash 86 is used). If no such entry 88 is found in the Stash 86, then Cuckoo manager 80 indexes into the Cuckoo filter 70 using the given logical address 58 and the Cuckoo hash 82 to obtain a set of entries 72 that are potential matches. Since each such entry 72 has an tablet pointer 76, and since the age of the tablet 46, 54 to which it points can be estimated by its monotonically-increasing integer identifier, Cuckoo manager 80 first looks up the logical address 58 in the most recent tablet 46, 54, proceeding to the next most recent tablet 46 if a matching key-value pair 64 is not found in the previous one. Thus, by finding the most recent tablet 46, 54 that includes a key-value pair 64 keyed by the logical address 58, Cuckoo manager 80 identifies the most recent version of the metadata entry 60 for the given logical address 58.

In some embodiments, memory 40 may also include a persistent storage portion (not depicted). Persistent storage portion of memory 40 may be made up of one or more persistent storage devices, such as, for example, disks. Persistent storage portion of memory 40 or persistent storage 42 is configured to store programs and data even while the computing device 32 is powered off. The OS and the applications 50, 52, 80, 90 are typically stored in this persistent storage portion of memory 40 or on persistent storage 42 so that they may be loaded into a system portion of memory 40 from this persistent storage portion of memory 40 or persistent storage 42 upon a restart. These applications 50, 52, 80, 90 when stored in non-transient form either in the volatile portion of memory 40 or on persistent storage 42 or in persistent portion of memory 40, form a computer program product. The processing circuitry 34 running one or more of these applications or drivers 50, 52, 80, 90 thus forms a specialized circuit constructed and arranged to carry out the various processes described herein.

In some embodiments, techniques may be used to persist open tablet 54, Cuckoo filter 70, and/or Stash 86 even though they are stored within memory 40 in order to protect against metadata loss in the event of a power failure or other catastrophic event. Thus, these data structures may be stored within a battery-backed portion of memory 40, they may be mirrored onto another computing device 32, or they may be regularly backed up onto persistent storage 40. In some embodiments, the closed tablets 46 and/or combined tablet 48 are also protected against loss by being stored using a RAID or similar scheme.

The above-referenced Cuckoo tree provides an approach to store metadata that is rapidly updated and provides improved storage performance and density at low cost. However, as described above, the Cuckoo tree assumes that a key only exists once. If the key is updated then the new entry obsoletes the old/existing entry.

In some applications the entries with the same key will need to be stored numerous times which is not supported by the Cuckoo tree. For example, in many metadata applications there is a need to maintain reference counts. In such applications, each entry is a numerical increment or decrement to an absolute value associated with the entry. Also, a search on the key must either consolidate the matching entries or return the individual matching entries.

The embodiments described herein provides an extension to the Cuckoo tree with a B-tree duplicate key support and a Cuckoo stash (Stash). The Cuckoo tree is a collection of B-trees, also referred to as tablets. Tablets can be in one of two states: active or frozen. Active tablets are read/write (RW). Frozen tables are read only (RO). Updates are only done to active tablets. Since the tablets are B-trees there are techniques to allow the same to key to exist in a tablet. So, if any entry is added to a tablet that already has another entry with the same key, the second entry can be added. For example, the entries can have a compound key of which the first key is the main key and the second key is a persistent sequence number. The two entries thus have different keys and will be adjacent to each other in the tablet. In commonly assigned patent application serial no. x/xxx,xxx, entitled "Space Accounting for Data Storage Usage," and filed on (date)," an active tablet can become frozen after some criteria has been met, such as an external command, time duration, or a capacity threshold has been reached. Afterwards, updates are done to a new tablet. Thus, an entry with the same keys (i.e., duplicates) can be in multiple tablets. The above-described Cuckoo tree utilizes the Cuckoo filter to find the tablet with the most recent entry but the Cuckoo filter does not provide a way to find all the entries. The "Space Accounting" application is incorporated herein by reference in its entirety.

The Cuckoo filter stores a fingerprint (e.g., a shortened hash value) of the key used in the Cuckoo tree. Fingerprints are stored as opposed to entire keys to save on memory. Fingerprints can be stored in two fingerprint bucket 201s in the Cuckoo filter. On lookup for a given key, the filter is first checked to see if the fingerprint for the key exists in either of the two buckets. Only if the filter returns true, is the tablet searched to obtain the key/value pair. It is noted that the filter can return false positives, since only the fingerprints are stored in the filter and multiple keys can have the same fingerprint, but it will not return false negatives.

This approach has two challenges: first, the number of entries with the same key can only be stored **2\*bucket_size** times in the Cuckoo filter; second, one or more of the fingerprints could be false positives, that is entries with a different key that have the same fingerprint and bucket location. False positives are undesirable because they cause unnecessary searches of the designated tablets. Like any hash table, existing techniques use resizing and rehashing when the Cuckoo filter hash table is full or when collisions occur. Another technique to handle overflows is by using a lookaside table; that is, a separate hash table where overflows can be stored.

Current hashing techniques are known to have certain disadvantages. For example, a hopscotch hash is not lock free, a linear hashing technique requires frequent resizing and rehashing, a Cuckoo hash does not provide enough slots for duplicates and requires resizing and rehashing, and a Bloom filter can only return a bit so a separate bloom filter must be dedicated to each tablet (thus, there is a possibility of an unnecessary read of a table due to a false positive on each tablet search, and all filters need to be searched to determine a miss).

Existing hash table collision techniques are also known to have disadvantages. For example, linear probing results in duplicate keys not being stored in the same locality, and chaining needs frequent memory allocations to create space for new nodes in the linked list.

The embodiments described herein enhances the above-described Cuckoo filter 70 with a Cuckoo Stash 86. The Cuckoo filter, which acts as a filter for lookups to the Cuckoo tree, is enhanced with a Cuckoo stash (e.g., to handle the case for duplicate keys stored in the Cuckoo tree), and limits false positives for improved lookup performance. A duplicate threshold 100 is set to limit the number of times a fingerprint may exist in a filter bucket to reduce the worst-case number of false positives. In addition, the Stash 86 is provided in the system 30. The threshold 100, or limit, is a simple check added to the store operation described above. If during the store of a key, the number of existing entries with the same fingerprint in a target bucket of the trial Cuckoo path would exceed a designated threshold value 100, the Cuckoo path is considered blocked and another path is attempted.

If all Cuckoo paths are blocked, then the key will be added to the above-referenced Stash 86, which is particularly designed to handle duplicates (e.g., multiple keys hashing to the same fingerprint or the same key being added multiple times to the Cuckoo tree with different values). The Stash 86 will mostly end up having keys that are duplicated often as those keys overflowed the Cuckoo filter's bucket duplication threshold. It can also contain unduplicated keys for which no cuckoo path was found as noted in [0044]. The Stash 86 will store full keys not fingerprints so it will not have false positives. As indicated above, storing the entire key is feasible because the number of keys in the Stash 86 is expected to be much smaller as compared to the number in the main Cuckoo filter table with each key having multiple values.

This Stash 86 offers advantages over other forms of stashes in that values for a key are stored in a small number of cache lines so that retrieval is fast, and minimal locking is required (only when a fresh duplicate key is to be added or an empty slot is not available in the current bucket for the given key, a key hash table (shown in FIGS. 3-302) is effectively locked; in all other cases only locking the specific cache line in a value store (shown in FIGS. 3-306A-306C) is required), and no resizing rehashing or on the fly memory allocations of the Cuckoo filter 70 are required to be done. In a worse case, the Stash 86 needs to be resized but this is much easier to do than resizing the Cuckoo filter 70.

Figure 2:
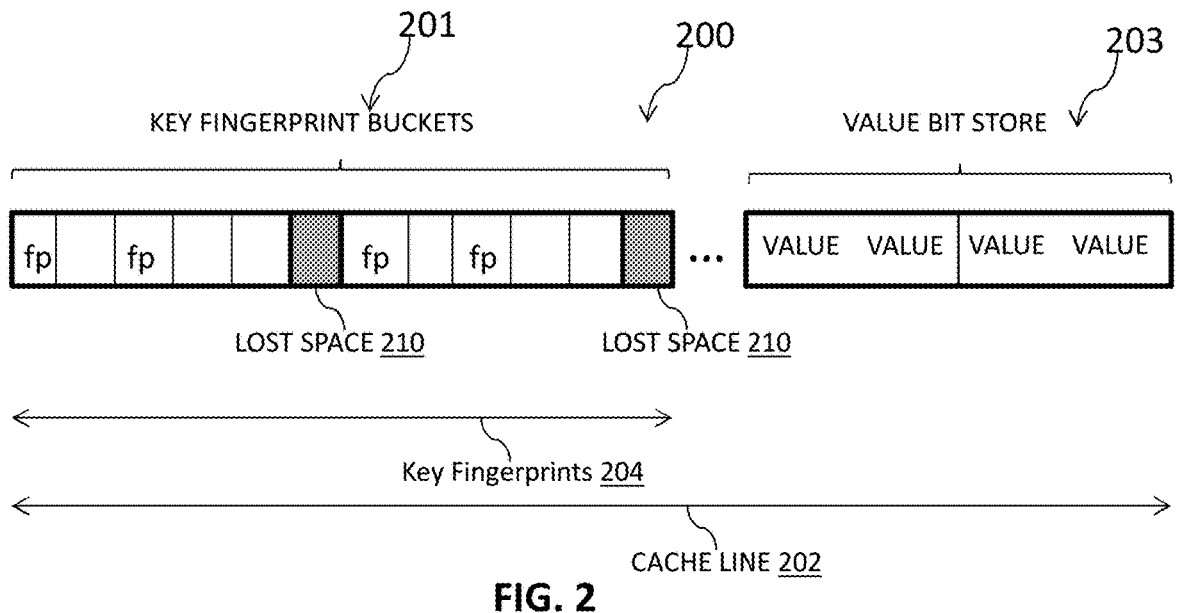
FIG. 2 is a diagram depicting Cuckoo filter table according to various embodiments.

A design for the Stash 86 and the Cuckoo filter 70 to handle collisions is shown in FIGS. 2 and 3. The Cuckoo filter table 200 (Cuckoo filter 70) of FIG. 2 includes a cache line 202 comprised of fingerprint bucket 201s and a value bit store 203. The fingerprint buckets, which are quadwords, of the Cuckoo filter table 200 store signatures of individual keys 204 as bitfields and the value store of the Cuckoo filter table 200 stores tablet references "value bitfields" corresponding to the keys. The value bitfields are a reference to the identifier of the tablet in which the key is present. The fingerprint bucket 201s also include a lost space 210, which is the space in the fingerprint bucket 201 into which no key fingerprint can fit. Operations with respect to the Cuckoo tree filter 200 will be described further herein.

The Stash 300 is comprised of a key hash table 302 and the value store 304. The key hash table 302 stores [key, bucket index reference] for each key. The reference points to a reverse time ordered list of values where all values associated with a given key are stored in buckets on one cache line (unless the values exhaust one cache line and another is needed, effectively creating a linked list of buckets, using a link word to link to the next bucket) of the value store. In some embodiments key hash table 302 is implemented as a Cuckoo Hash table.

The Stash 300 shown in FIG. 3 corresponds to the Stash 86 shown in FIG. 1. In the diagram 300 {v16, v15, v14, v13, v12, v11} are values of key1, where v12 is a newer value as compared to v11, and v13 is a newer value as compared to v12, v16 being the latest value associated with key1. Initially when v11 is added to the Stash 300, key1 in key hash table 302 would be referring to bucket index bi=0. The link word 314 would be set to bi=−1. When a new value v12 associated with key1 needs to be added, value bits in bi=0 are shifted to the right, and v12 is placed before v11 since v12 represents a newer value. After v13 is added to the bucket, the bucket is full and a new bucket needs to be selected to add values for key1. Assuming key2 and its values {v21}, and key3 and its values {v32, v31} are already added, hence using up buckets bi=1 and bi=2 respectively, the next empty bucket available (from the stash bucket list) to store key1's new value v14 is bucket bi=3. The key hash table 302 is now updated so that key1 points to bi=3, along with bucket bi=3's link word being updated to bi=0 (from bi=−1) to point to the old values of key1 (i.e. v13, v12, v11). This effectively forms a chain of buckets where key1's values are stored, with the key hash table 302 pointing to the latest bucket, and further following the link words of the buckets until the end of the chain is reached when link word is found to be bi=−1. This chain of buckets effectively represents a reverse time ordered list of values of a key since the values within a bucket are also stored sorted in reverse time order. The values are stored in a cache line aligned raw memory store, referred to as the value store 304. Three cache lines 306A-306C are shown in Stash 300. Each of the cache lines (collectively 308) may have 8 64-bit quadwords. A set of four adjacent quadwords on the same cache line is a stash bucket, each stash bucket having a unique bucket index bi. As shown in FIG. 3 for illustrative purposes, a set of four quadwords comprises bucket 2 (310) having a bucket index 2 (bi=2). One stash bucket is of size four quadwords of which three quadwords are used to store a bit stream of values (each value is terminated with an in-use bit—not shown) and one quadword is used as a link word (e.g., linkword 314). Each stash bucket can have n slots for storing values, where n will depend on the size of each value being stored (n=(bucket_size−link_word_size)/(value_size+in_use_bit size), all sizes are in bits). If the link word has a value other than −1, then it indicates the bucket index of another stash bucket that is associated with this key. If the link word is −1 then there are no more stash buckets associated with this key.

The embodiments described herein are ideal since the Cuckoo stash has low read cost and low update costs. Inserts only occur to the key hash table 302 when a fresh duplicate key is to be added, which is less frequent. Most write operations involve updates to the value store 304 and not the key hash table 302. All lookup operations only involve reading one entry of the key hash table 302 and its corresponding cache line of values. The reverse time ordering helps for applications that require only the latest added value(s) to be returned. The key hash table 302 can be embodied as a Cuckoo hash table designed along similar lines to the Cuckoo filter, as described in FIG. 2, except that it stores keys instead of fingerprints of the keys. Overflows from the key hash table 302 are handled using a singly linked list to store [key, value] pairs. This list is expected to be extremely small containing only a few [key, value] pair nodes.

Add, find, and remove operations may be performed for the Cuckoo tree using the Stash. For an add operation, the process first attempts to add a key/value to the Cuckoo filter table 200. In the event of a failure, it is added to its Stash 300. For a find operation, the process performs a lookup in the Stash 300 and obtains a bitmap of values, then performs a lookup in the Cuckoo filter table 200 and obtains another bitmap of values. The process performs a bitwise OR operation on the two bitmaps and returns the resultant bitmap. For a remove operation, the process removes the key from the key hash table of the stash and frees the buckets holding its values followed by removing the appropriate [fingerprint, value] combination from the Cuckoo filter table. These processes are described further herein.

Figure 4:
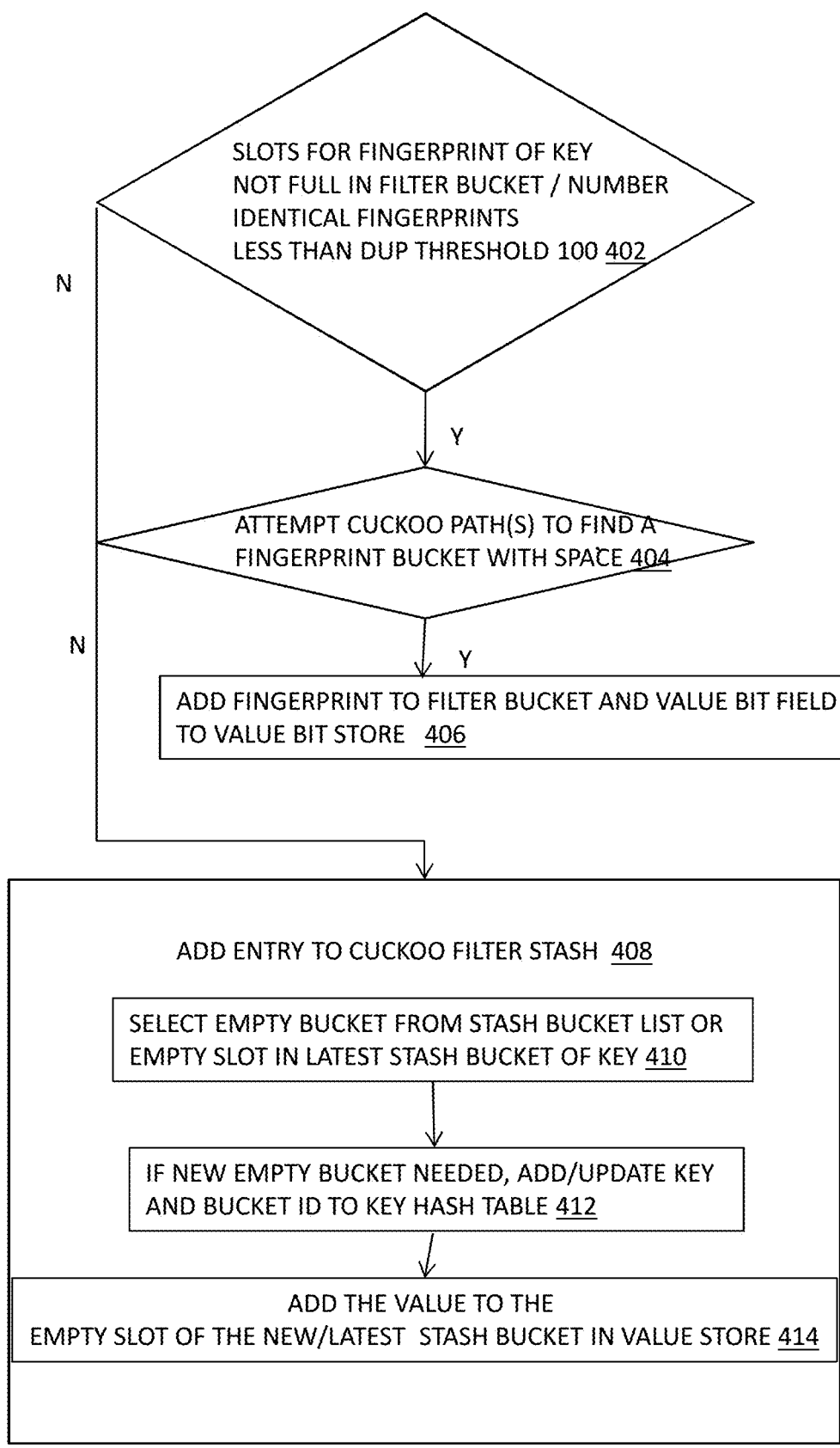
FIG. 4 is a flowchart depicting an example add operation for a key/value pair to a Cuckoo tree according to various embodiments.

Turning now to FIG. 4, a flow diagram of a process 400 to add a key to the Cuckoo tree will now be described in embodiments. In block 402, process 400 checks if a slot is available in Cuckoo filter table 200 for the given fingerprint of key. If slots are not full, in block 404, process 400 calculates Cuckoo path(s) for the fingerprint of the key. If a Cuckoo path is found, the fingerprint of the key and the value are stored in the Cuckoo filter table 200 in block 406. If a Cuckoo path is not found, the process 400 adds the key/value pair to the Cuckoo filter stash 300 in block 408.

Otherwise, if the slots are all full in the Cuckoo filter table 200, the process 400 adds the key/value pair to the Cuckoo filter stash 300 in block 408. This step includes checking if there is already a stash bucket with empty slot for the key and if not, selecting a new empty stash bucket from the stash bucket list in block 410. In block 412, an entry is added/updated to the key hash table (if a new bucket was needed in block 410) with key and selected bucket index from block 410. In block 414, the value of the key/value pair is entered into the empty slot of selected bucket in the value store.

Described below is an example add operation, with the following assumptions:

The Cuckoo tree has p tables; the Cuckoo filter has a bucket threshold of n/2 which means a fingerprint has n available slots, n<p; the fingerprint function which converts key to fingerprint is fp=Fp(key); the Cuckoo filter table and its stash are initially empty prior to the add operation.

Add [k1, v11] to tablet 1, [k1, v12] to tablet 2, ..., [k1, v1(n−1)] to tablet (n−1) of the Cuckoo tree.

The Cuckoo filter table now has entries [fp1,1], [fp1, 2], ... [fp1, n−1].

Add [k2, v22] to tablet p such that Fp(k1)=Fp(k2).

The Cuckoo filter table now has entries [fp1, 1], [fp1, 2], ..., [fp1, n−1], [fp1, p]. At this point all of the slots for fp1 in the Cuckoo filter are occupied.

Add [k1, v1n] to tablet n. Since the Cuckoo filter table 200 is full, this entry needs to be added to the stash.

Select an empty bucket from the stash bucket list, say bi=0. Entry [k1, 0] is added to the key hash table (since k1 does not already exist in the key hash table). Value vin is added to slot 0 of bi=0. Representing [key hash table entry→value store entry] as [k1, 0]→[n, NULL, ..., NULL: link word=−1] is the entry added to the stash.

Add [k1, v1(n+1)] to tablet n+1, [k1, v1(n+2)] to tablet n+2, ..., [k1, v1m] to tablet m, where (m<p).

The Cuckoo filter table 200 has entries [fp1, 1], [fp1, 2], ..., [fp1, n−1], [fp1, p]. The Cuckoo stash now has entry [k1, 0]→[m, m−1, ..., n+1, n: link word=−1] (the values are stored in reverse time order). Here the bucket size of the stash bucket=(m−n+1) so all duplicates fit in one bucket.

Figure 5:
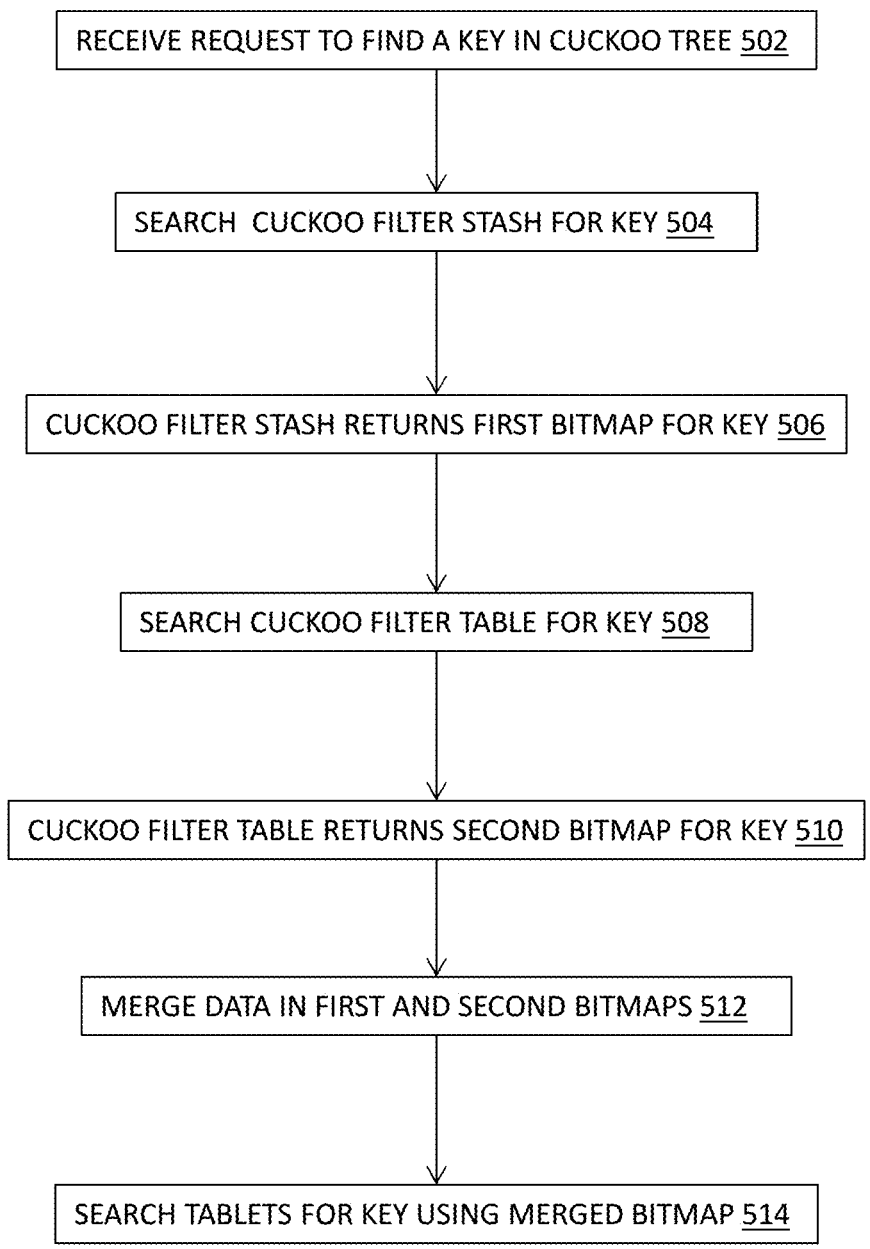
FIG. 5 is a flowchart depicting an example find operation for a key in a Cuckoo tree according to various embodiments.

Turning now to FIG. 5, a process 500 for performing a find key operation with respect to the Cuckoo tree will now be described. In block 502, a request is received to find a key in the Cuckoo tree, and in block 504, the Stash is searched for the key. In block 506, the Stash returns a first bitmap for the key. FIG. 6A illustrates a sample first bitmap 600A with sample values. The position of the bit is the tablet index. Whether the bit is set or not at that position indicates whether the key should be searched for or not in that tablet. If the bit is set at position 1, it means that tablet with index 1 might contain the key we are looking for. If the bit is zero at position 1, it means that the filter has filtered out that tablet and we must not go looking for the key in that tablet. In the figure, we must search all tablets with indexes from 1 to m and tablet with index p. We will not look for the key in tablets with indexes m+1 to p−1.

In block 508, the process 500 searches the Cuckoo filter table for the key, and in block 510, the Cuckoo filter table returns a second bitmap for the key. FIG. 6B illustrates a second bitmap 600B with sample values.

In block 512, the process 500 merges the data in the first and second bitmaps 600A and 600B. For example, the merge operation may be implemented as an OR operation on the two bitmaps. The merge operation results in a third bitmap 600C shown in FIG. 6C. In block 514, the process 500 searches the tablets for the key using the merged bitmap 600C The third/merged bitmap reflects which tablets the key may be in.

An example of a find operation in the Cuckoo tree will now be described with respect to the key hash table and the value store.

Find k1 in the Cuckoo tree.

The stash returns a first bitmap 1.

The Cuckoo filter table returns a second bitmap2.

A merged bitmap is created by performing an OR operation on the bitmap 1 and the bitmap2.

Find in tables 1, n, ... m, p. Each tablet search is a search in the corresponding B-tree. Note that key k1 won't be found in tablet p since it contains k2 (where fp(k1)=fp(k2)). This is a false positive returned by the Cuckoo filter. The values [v11, v12, ..., v1n, ..., v1m) of key k1 found in the tables can be processed as per requirements.

An alternate embodiment of the find operation can be used where the Cuckoo filter table is searched first. Only if there is a hit, is the stash checked. This improves lookup performance because most keys do not exist in the Stash. This process is slightly more complex because it requires entries to be transferred from stash to Cuckoo filter table if a key is fully removed from the Cuckoo filter.

A process for removing from the Cuckoo tree will now be described with respect to the key hash table and the value store.

A remove operation from the Cuckoo tree is effectively an add of a remove marker value to the Cuckoo tree. This operation is performed during a shutdown of the Cuckoo tree (in debug version) or during the destruction of tablets in case of a Cuckoo tree destroy (in debug version) or a Cuckoo Tree merge operation.

To remove [key, tablet id]=[k1, 1] from the Cuckoo filter, the following operations are performed:

Remove from Cuckoo filter table [fp1, 1]. The Cuckoo filter needs the tablet ID to be passed to the remove operation in addition to the key since one would not want to end up removing [fp1, p] since this represents an entry of key k2. The Cuckoo filter table now has entries [fp1, 2], . . . , [fp1, n−1], [fp1, p]. The stash has entry [k1, 0]→[m, m−1, . . . , n+1, n: link word=−1].

Remove the key k1's entry from the stash by removing [k1, 0] from the key has table and freeing bucket bi=0. The stash does not need the table ID to be passed to the remove operation since we store entire keys in the stash and not just fingerprints.

A process for performing a merge operation on the Cuckoo tree will now be described with respect to the Cuckoo filter table and the Stash. The tablets of the Cuckoo tree are periodically merged into one large B-tree tablet. At the completion of the merge of these tablets, they are deleted and; their corresponding entries must be removed from the Cuckoo filter and Stash. For each tablet, its B-tree is traversed. For every key found in the traversal, the [key, tablet id] pair (where tablet ID is the current tablet being traversed for deletion) is removed from the Cuckoo filter and its stash. The removal of a [key, tablet id] pair is done as described above with respect to removal from the Cuckoo filter.

Figure 7:
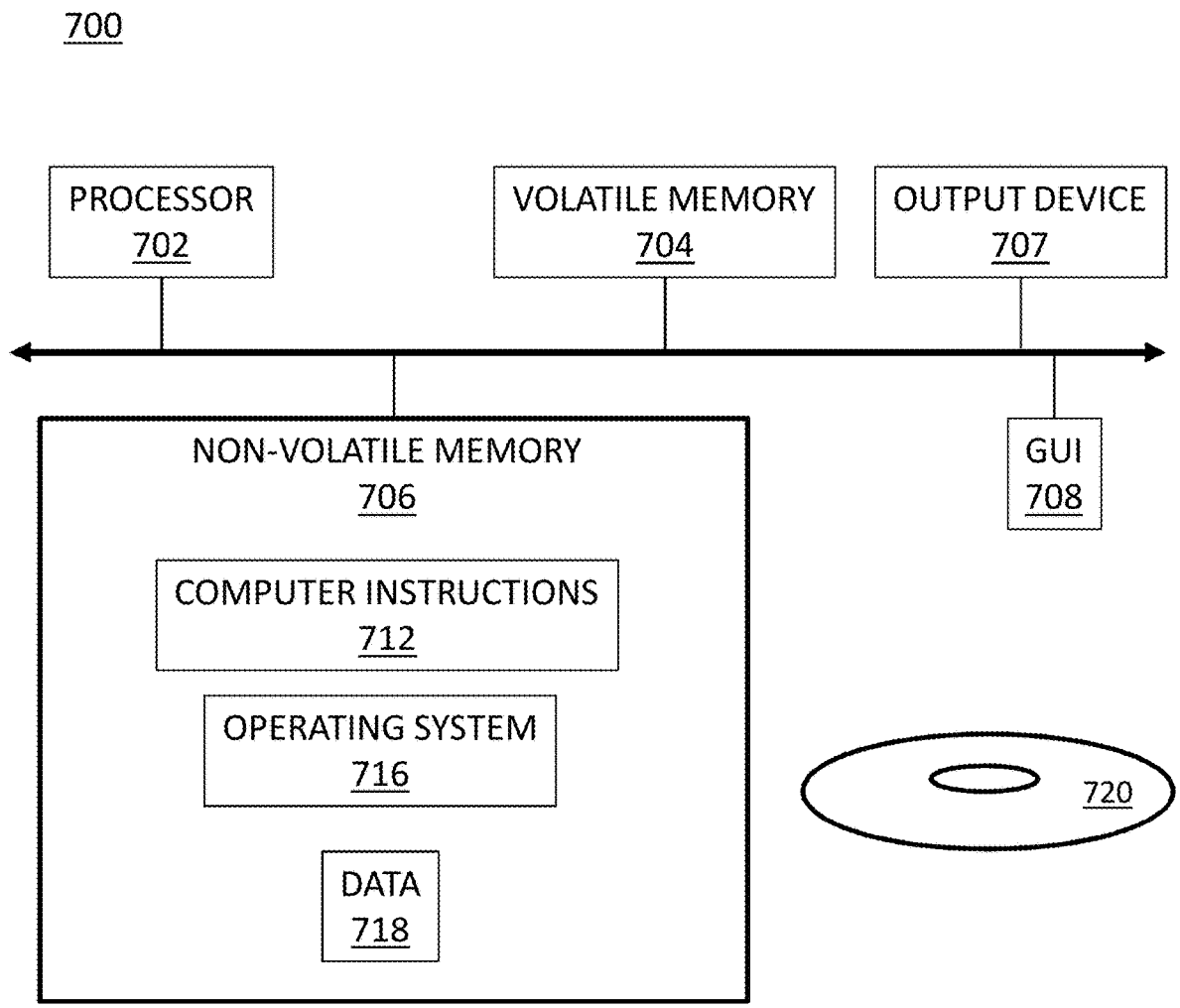
FIG. 7 is a block diagram of an illustrative computer that can perform at least a portion of the processing described herein.

FIG. 7 shows an exemplary computer 700 (e.g., physical or virtual) that can perform at least part of the processing described herein. The computer 700 includes a processor 702, a volatile memory 704, a non-volatile memory 706 (e.g., hard disk or flash), an output device 707 and a graphical user interface (GUI) 708 (e.g., a mouse, a keyboard, a display, for example). The non-volatile memory 706 stores computer instructions 712, an operating system 716 and data 718. In one example, the computer instructions 712 are executed by the processor 702 out of volatile memory 704. In one embodiment, an article 720 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to the disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method of implementing a Cuckoo tree with duplicate key support in a storage system, the method comprising:
    providing a Cuckoo filter table configured to perform lookups in a Cuckoo tree, the Cuckoo filter table tracking fingerprints of keys and corresponding tablets in which the keys reside;
    providing a Cuckoo stash (Stash) configured to manage duplicate keys in the Cuckoo tree, the Stash comprising:
    a value store; and
    a key hash table storing full keys and corresponding bucket index references that point to a reverse time ordered list of values corresponding to the full keys, wherein all of the values that correspond to a given key are stored on a fixed number of cache lines in the value store, the value store including stash buckets with slots for storing the reverse time ordered list of values;
    setting a duplicate threshold value in the Cuckoo tree, the duplicate threshold value providing a limit on a number of fingerprints that can exist in a Cuckoo filter bucket;
    wherein during a store operation on a key, upon determining the number of existing entries with same fingerprint in a target stash bucket would exceed the duplicate threshold another stash bucket is selected for the key.

2. The method of claim 1, further comprising:
    adding a link reference to the target stash bucket that identifies the other stash bucket.

3. The method of claim 2, where each cache line in the value store has 8 64-bit quadwords, each cache line is divided into two stash buckets, and each of the stash buckets has a unique bucket index.

4. The method of claim 3, wherein each bucket has four quadwords, three of the four quadwords store values and a fourth quadword stores the link reference.

5. The method of claim 1, further comprising:
attempting to add a key/value pair to a tablet;
upon determining slots for a fingerprint corresponding to the key are full in the Cuckoo filter table:
selecting an empty stash bucket from the value store;
entering the key and stash bucket identifier to the key hash table; and
adding the value of the key/value pair to an available slot of the stash bucket in the value store.

6. The method of claim 1, further comprising:
receiving a request to find a key in the Cuckoo tree;
searching the Stash for the key;
returning, by the Stash, a first bitmap for the key;
searching the Cuckoo filter table for the key;
returning, by the Cuckoo filter table, a second bitmap for the key;
merging data in the first and second bitmaps to produce a third bitmap; and
searching tablets for the key using the third bitmap.

7. A system for implementing a Cuckoo tree with duplicate key support in a storage system, the system includes:
a memory comprising computer-executable instructions; and
a processor executing the computer-executable instructions, the computer-executable instructions when executed by the processor cause the processor to perform operations comprising:
providing a Cuckoo filter table configured to perform lookups in a Cuckoo tree, the Cuckoo filter table tracking fingerprints of keys and corresponding tablets in which the keys reside;
providing a Stash configured to manage duplicate keys in the Cuckoo tree, the Stash comprising:
a value store; and
a key hash table storing full keys and corresponding bucket index references that point to a reverse time ordered list of values corresponding to the full keys, wherein all of the values that correspond to a given key are stored on a single cache line in a value store, the value store including stash buckets with slots for storing the reverse time ordered list of values;
setting a duplicate threshold value in the Cuckoo tree, the duplicate threshold value providing a limit on a number of fingerprints that can exist in a bucket;
wherein during a store operation on a key, upon determining the number of existing entries with same fingerprint in a target stash bucket would exceed the duplicate threshold another stash bucket is selected for the key.

8. The system of claim 7, wherein the operations further comprise:
adding a link reference to the target stash bucket that identifies the other bucket.

9. The system of claim 8, where each cache line in the value store has 8 64-bit quadwords, each cache line is divided into two stash buckets, and each of the stash buckets has a unique bucket index.

10. The system of claim 9, wherein each bucket has four quadwords, three of the four quadwords store values and a fourth quadword stores the link reference.

11. The system of claim 7, wherein the operations further comprise:
attempting to add a key/value pair to a tablet;
upon determining filter buckets for a fingerprint corresponding to the key are full in the Cuckoo filter table:
selecting an empty stash bucket from the value store;
entering the key and stash bucket identifier to the key hash table; and
adding the value of the key/value pair to an available slot in the bucket in the value store.

12. The system of claim 7, wherein the operations further comprise:
receiving a request to find a key in the Cuckoo tree;
searching the Stash for the key;
returning, by the Stash, a first bitmap for the key;
searching the Cuckoo filter table for the key;
returning, by the Cuckoo filter table, a second bitmap for the key;
merging data in the first and second bitmaps to produce a third bitmap; and
searching tablets for the key using the third bitmap.

13. A computer program product for implementing a Cuckoo tree with duplicate key support in a storage system, the computer program product embodied on a non-transitory computer readable medium, the computer program product including instructions that, when executed by a computer, causes the computer to perform operations comprising:
providing a Cuckoo filter table configured to perform lookups in a Cuckoo tree, the Cuckoo filter table tracking fingerprints of keys and corresponding tablets in which the keys reside;
providing a Stash configured to manage duplicate keys in the Cuckoo tree, the Stash comprising:
a value store; and
a key hash table storing full keys and corresponding bucket index references that point to a reverse time ordered list of values corresponding to the full keys, wherein all of the values that correspond to a given key are stored on a single cache line in a value store, the value store including stash buckets with slots for storing the reverse time ordered list of values;
setting a duplicate threshold value in the Cuckoo tree, the duplicate threshold value providing a limit on a number of fingerprints that can exist in a bucket;
wherein during a store operation on a key, upon determining the number of existing entries with same fingerprint in a target stash bucket would exceed the duplicate threshold another stash bucket is selected for the key.

14. The computer program product of claim 13, wherein the operations further comprise:
adding a link reference to the target stash bucket that identifies the other bucket.

15. The computer program product of claim 14, where each cache line in the value store has 8 64-bit quadwords, each cache line is divided into two stash buckets, and each of the stash buckets has a unique bucket index.

16. The computer program product of claim 15, wherein each bucket has four quadwords, three of the four quadwords store values and a fourth quadword stores the link reference.

17. The computer program product of claim 13, wherein the operations further comprise:
attempting to add a key/value pair to a tablet;
upon determining filter buckets for a fingerprint corresponding to the key are full in the Cuckoo filter table:

selecting an empty stash bucket from the value store;
entering the key and stash bucket identifier to the key hash table; and
adding the value of the key/value pair to a slot in the stash bucket in the value store.

18. The computer program product of claim 13, wherein the operations further comprise:
receiving a request to find a key in the Cuckoo tree;
searching the Stash for the key;
returning, by the Stash, a first bitmap for the key;
searching the Cuckoo filter table for the key;
returning, by the Cuckoo filter table, a second bitmap for the key;
merging data in the first and second bitmaps to produce a third bitmap; and
searching tablets for the key using the third bitmap.

\* \* \* \* \*